United States Patent [19]
Sato et al.

[11] Patent Number: 5,770,900
[45] Date of Patent: Jun. 23, 1998

[54] STEPPER MOTOR

[75] Inventors: Koichi Sato; Hiroyasu Numaya, both of Niigata, Japan

[73] Assignee: Nippon Seiki K.K., Niigata, Japan

[21] Appl. No.: 746,948

[22] Filed: Nov. 18, 1996

[30] Foreign Application Priority Data

Nov. 17, 1995 [JP] Japan ..................... 7-323879

[51] Int. Cl.⁶ .................................. H02K 37/14
[52] U.S. Cl. ................. 310/49 R; 310/71; 310/194; 310/67 R; 310/254; 310/43
[58] Field of Search ..................... 310/71, 49 R, 310/194, 67 R, 258, 259, 43, 254; 242/1.1 R; 336/192, 198, 185, 208

[56] References Cited

U.S. PATENT DOCUMENTS

| | | | |
|---|---|---|---|
| 3,457,534 | 7/1969 | Davis | 336/192 |
| 4,329,606 | 5/1982 | Montagu | 310/71 |
| 4,639,628 | 1/1987 | Kobayashi et al. | 310/194 |
| 4,660,015 | 4/1987 | Finck et al. | 310/71 |
| 4,714,850 | 12/1987 | Akiba et al. | 310/49 R |
| 4,720,646 | 1/1988 | Torimoto | 310/71 |
| 4,731,555 | 3/1988 | Torimoto et al. | 310/71 |
| 4,825,112 | 4/1989 | Mineyama | 310/71 |
| 4,954,801 | 9/1990 | Urbanski | 336/90 |
| 5,004,941 | 4/1991 | Ohzeki et al. | 310/49 R |
| 5,057,732 | 10/1991 | Fukaya | 310/208 |
| 5,073,735 | 12/1991 | Takagi | 310/71 |
| 5,247,216 | 9/1993 | Borman | 310/49 R |
| 5,260,616 | 11/1993 | Mizutani et al. | 310/49 R |
| 5,270,604 | 12/1993 | Sandel et al. | 310/194 |
| 5,291,084 | 3/1994 | Shiotsuki et al. | 310/49 R |
| 5,635,781 | 6/1997 | Moritan | 310/71 |

FOREIGN PATENT DOCUMENTS

| | | | |
|---|---|---|---|
| 29501695 | 6/1995 | Germany | H02K 11/00 |
| 61258662 | 4/1987 | Japan | H02K 37/10 |
| 63-156567 | 10/1988 | Japan | H02K 37/14 |
| 1-190248 | 7/1989 | Japan | H02K 37/14 |
| 1-190249 | 7/1989 | Japan | H02K 37/14 |
| 3-145960 | 6/1991 | Japan | H02K 37/14 |
| 5-64411 | 3/1993 | Japan | H02K 37/14 |
| 5-161333 | 6/1993 | Japan | H02K 37/14 |
| 5-50987 | 7/1993 | Japan | H02K 37/14 |
| 5064411 | 7/1993 | Japan | H02K 3/52 |
| 5-207725 | 8/1993 | Japan | H02K 37/14 |
| 07075277 | 3/1995 | Japan | H02K 3/46 |

Primary Examiner—Thomas M. Dougherty
Assistant Examiner—B. Mullins
Attorney, Agent, or Firm—McDermott, Will & Emery

[57] ABSTRACT

It is intended to provide a stepper motor having windings which are easy to wind. Increase in size of the motor itself can be circumvented.

First and second coil blocks 20 and 21, respectively, are formed by first and second annular bobbins 27 and 34, respectively, and by first and second annular yokes 28, 29, 35, 36. The bobbins have winding portions 25, 32 on which first and second exciting coils 26, 33, respectively, are wound. A magnet rotor 22 having a rotating shaft 41 mounted thereto is rotatably held in a gap 43 between the coaxial laminations of the coil blocks 20, 21. Connector terminals 37 and 38 consisting of first connection portions 37a, 38a and second connection portions 37b, 38b are buried in the annular bobbins 34 of the second coil block 21. The first connection portions 37a, 38a protrude from a flange 30 in a direction substantially perpendicular to the axis of the rotating shaft 44. The second connection portions 37b, 38b extend from the winding portion 32 in a direction substantially parallel to the axis of the rotating shaft 44. Terminal ends 26a, 33a of the first and second exciting coils 26, 33 are electrically connected with the protruding ends of the first connection portions 37a, 38a. The protruding ends of the second connection portions 37b, 38b are electrically connected with a printed-wiring board (external electric apparatus) 45.

6 Claims, 4 Drawing Sheets

STEPPER MOTOR

TECHNICAL FIELD

The present invention relates to a permanent-magnet stepper motor and, more particularly, to a structure for electrically connecting exciting coils with an external electric apparatus.

BACKGROUND ART

Permanent-magnet stepper motors have been widely accepted as actuator components in office automation appliances, home electrical appliances, automobiles, and other applications. Many of these motors have two annular bobbins on which exciting coils are respectively wound. Each bobbin is held between two parts of an annular yoke, thus forming two coil block laminations. A magnet rotor is rotatably mounted in these laminations. Exciting signals with shifted phases are applied to the exciting coils. Thus, magnetic attracting or repelling force is produced between the excitation pole guided to the annular yokes and the magnetic pole of the magnet rotor. In this way, the magnet rotor is rotated in given angular steps. For example, this technique is described in Patent Laid-Open Nos. 161333/1993, 145960/1991, 190249/1989, and 190248/1989.

In this type of permanent-magnet stepper motor, signals are applied to the exciting coils via connector terminals. More specifically, as disclosed in Utility Model Laid-Open Nos. 50987/1993 and 1565671988, it is common practice to firmly mount the connector terminals to terminal mounting portions protruding from the outer peripheries of the annular bobbins. The terminal ends of the exciting coils are electrically connected with these connector terminals. Leads brought out from a control-and-drive circuit or connectors (external electric apparatus) are electrically connected with the front ends of the connector terminals.

This structure for connection of the exciting coils, using these connector terminals, needs leads or connectors. Therefore, this structure is complex and made up of a large number of components. Accordingly, as disclosed, for example, in Patent Laid-Open No. 64411/1993 and shown in FIG. 5, a stepper motor in which the connector terminals are connected directly with an external electric apparatus such as a printed-wiring board has been proposed. This stepper motor has two annular bobbins 3 and 4 on which exciting coils 1 and 2 are respectively wound. The bobbins are held between opposite portions of annular yokes 5 and 6, respectively, thus forming two coil blocks 7 and 8. The laminations of these coil blocks 7 and 8 form a gap 9 in which a magnet rotor 11 is rotatably mounted. A rotating shaft 10 is mounted to the rotor. A plurality of pole teeth 12 are formed on the annular yokes 5 and 6 of the coil blocks 7 and 8, respectively, to guide the excitation poles of the exciting coils 1 and 2 to the gap 9. The teeth are arranged circumferentially of the magnet rotor 11 and disposed opposite to each other. Terminal-mounting portions 13 protrude from the outer surfaces of the annular bobbins 3 and 4. Connector terminals 14 extending in the direction of the axis of the rotating shaft 10 are insert-molded in the terminal-mounting portions 13. The front end of this connector terminal 14 is directly soldered to the printed-wiring board (external electric apparatus) 15 on which a control circuit (not shown) and so on are formed. The printed-wiring board is mounted in the rear of the body. Because of this structure, a simple connection structure made up of a few number of components can be realized.

DISCLOSURE OF THE INVENTION

However, in the above-described structure where the connector terminals 14 are directly soldered to the printed-wiring board 15, it is difficult to wind the exciting coil 2 around the annular bobbin 4 of the coil block 8, because the connector terminals 14 are located on the outer surface of the winding portion 16 of the annular bobbin 4 of the coil block 8 insomuch as the connector terminals 14 must lead to the printed-wiring board 15. Furthermore, the connector terminals 14 extending to the printed-wiring board 15 must be prevented from touching the annular yoke 6 of the coil block 8. For this reason, it is necessary that the connector terminals 14 be spaced from the annular yoke 6. This increases the size of the motor itself accordingly.

In view of these points, the present invention has been made. It is a main object of the invention to provide a stepper motor having windings capable of being easily wound, the motor being further characterized in that increase in size of the motor itself can be circumvented.

In order to achieve the foregoing problem, the present invention provides a stepper motor comprising: a first coil block composed of a first annular bobbin and first annular yokes, said first annular bobbin comprising a first exciting coil wound around a cylindrical winding portion, said first annular yokes being laminated on opposite sides of said first annular bobbin, said first annular yokes acting to guide excitation poles of said first exciting coil toward inner surface of said winding portion; a second coil block composed of a second annular bobbin and second annular yokes, said second annular bobbin comprising a second exciting coil wound around a cylindrical winding portion, said second annular yokes being laminated on opposite sides of said second annular bobbin, said second annular yokes acting to guide excitation poles of said second exciting coil toward inner surface of said winding portion, said second coil block being laminated over said first coil bobbin coaxially; a magnet rotor having a rotating shaft rotatably held in a space formed inside said winding portions by laminating said first and second coil blocks, said magnet rotor being rotated by the excitation poles of said first and second annular yokes; and connector terminals buried in said annular bobbin of one of said coil blocks and having a first connection portion and a second connection portion, said first connection portion protruding in a direction substantially perpendicular to axis of said rotating shaft, said first connection portion being electrically connected with terminal ends of said first and second exciting coils, said second connection portion protruding from said winding portions in a direction substantially parallel to the axis of said rotating shaft, said second connection portion being electrically connected with an external electric apparatus.

In one feature of the invention, said second connection portion extends toward said external electric apparatus via a piercing portion formed in said annular yoke and said annular bobbin has an extension extending along said second connecting portion toward said external electric apparatus.

The present invention also provides a stepper motor comprising: a first coil block composed of a first annular bobbin and first annular yokes, said first annular bobbin comprising a first exciting coil wound around a cylindrical winding portion, said first annular yokes being laminated on opposite sides of said first annular bobbin, said first annular yokes acting to guide excitation poles of said first exciting coil into said winding portion; a second coil block composed of a second annular bobbin and second annular yokes, said second annular bobbin comprising a second exciting coil wound around a cylindrical winding portion, said second annular yokes being laminated on opposite sides of said second annular bobbin, said second annular yokes acting to guide excitation poles of said second exciting coil toward inner surface of said winding portion, said second coil block being laminated over said first coil bobbin coaxially; a magnet rotor having a rotating shaft rotatably held in a space formed inside said winding portions by laminating said first and second coil blocks, said magnet rotor being rotated by the excitation poles of said first and second annular yokes which are guided to pole teeth of said first and second annular yokes, respectively; first connector terminals buried in said annular bobbin of one of said coil blocks and having a first connection portion and a second connection portion, said first connection portion protruding in a direction substantially perpendicular to axis of said rotating shaft, said first connection portion being electrically connected with terminal ends of said first and second exciting coils, said second connection portion protruding from said winding portions in a direction substantially parallel to the axis of said rotating shaft, said second connection portion being electrically connected with an external electric apparatus; and second connector terminals buried in said annular bobbin of the other coil block and having a third connection portion and a fourth connection portion, said third connection portion protruding in a direction substantially perpendicular to the axis of said rotating shaft, said third connection portion being electrically connected with terminal ends of said exciting coils of the other coil block, said fourth connection portion protruding from said winding portions in a direction substantially parallel to the axis of said rotating shaft, said fourth connection portion extending through said one coil block, said fourth connection portion being electrically connected with the external electric apparatus.

In another feature of the invention, said second or fourth connection portion projects toward, or passes through, said external electric apparatus via a piercing portion formed in said annular yoke, and said annular bobbin has an extension extending along said second or fourth connection portion toward said external electrical apparatus.

In a further feature of the invention, said annular yokes have a plurality of pole teeth extending into said winding portions, and said second or fourth connection portion extends through said annular yokes without touching said pole teeth via a cutout that is formed between bases of said pole teeth and opens into said space.

In one embodiment of the invention, the first and second exciting coils are wound on the winding portions of the first and second annular bobbins, respectively. These bobbins and the first and second annular yokes constitute coaxial laminations of the coil blocks. The magnet rotor having the rotating shaft mounted thereto is rotatably mounted in the space between the coaxial laminations. The connector terminals are composed of the first and third connection portions protruding in a direction substantially perpendicular to the axis of the rotating shaft, together with the second and fourth connection portions extending from the winding portions in a direction substantially parallel to the axis of the rotating shaft. These connector terminals are buried in the annular bobbin or bobbins of one or both of the coil blocks. The first and third connection portions are electrically connected with the terminal ends of the first and second exciting coils. The second and fourth connection portions are electrically connected with an external electric apparatus. Since the connector terminals are not positioned on the outer surfaces of the winding portions of the annular bobbins, it is easy to wind the windings. Furthermore, increase in size of the motor itself is suppressed.

In another embodiment of the invention, the second or fourth connection portion protrudes to vicinities of the external electric apparatus through the piercing portion formed in the annular yoke. The extension extending toward the external electric apparatus along the second and fourth connection portions is formed and located in a position taken up by the annular bobbins, the position corresponding to the piercing portion. This prevents the second or fourth connection portion from coming into contact with the annular yokes.

In a further embodiment of the invention, the annular yokes have pole teeth extending into the winding portions. The second and fourth connection portions extend through the annular yokes without touching the pole teeth via the cutout which is formed between the bases of the teeth and open into the space. It is easy to machine the annular yokes through which the second or fourth connection portion extends. In addition, adverse influence on the magnetic circuit formed in the annular yokes including the pole teeth is alleviated.

Embodiments of the present invention are hereinafter described with reference to the accompanying drawings.

BRIEF DESCRIPTION OF THE DRAWINGS

FIG. 1 is an exploded perspective view showing a first example of a stepper motor according to the present invention. This example of stepper motor comprises first and second coil blocks 20 and 21, respectively, of similar construction, together with a magnet rotor 22 located inside the coil blocks 20 and 21.

Figure 1:
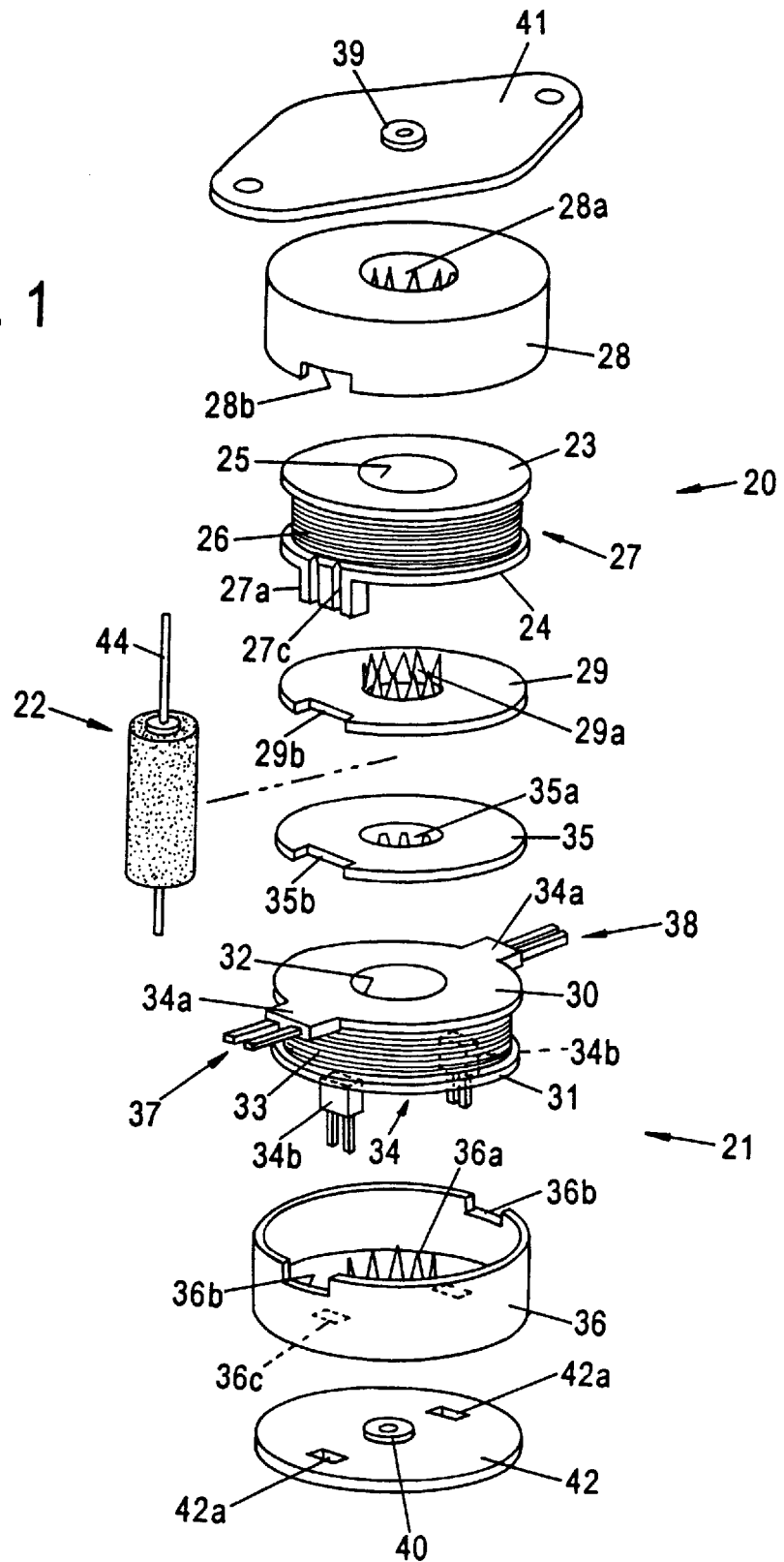
FIG. 1 is an exploded perspective view of a stepper motor according to a first embodiment of the present invention.

The first coil block 20 comprises a first annular bobbin 27 made of synthetic resin and a pair of first annular yokes 28 and 29 made of magnetic metal material. The first annular bobbin has a cylindrical winding portion 25 sandwiched between flanges 23 and 24 which are a pair of winding guides. A first exciting coil 26 is wound around the winding portion 25. The yokes 28 and 29 are located on opposite sides of the first annular bobbin 27 and laminated above and below (as viewed in the figure), respectively, the bobbin 27.

The annular yokes 28 and 29 have guide portions, for example plural pole teeth 28a and 29a, respectively, extending to the inner surfaces of the winding portion 25 of the first annular bobbin 27. These pole teeth 28a and 29a are arranged in a saw-toothed manner and surround the inner surface of the winding portion 25. One annular yoke 28 is shaped like a cup so as to be capable of receiving the first annular bobbin 27. The yoke 28 is provided with a cutout 28b. The other annular yoke 29 is shaped like a flat plate and provided with a cutout 29b into which a coil guide portion 27a is fitted, the coil guide portion 27a protruding below the first annular bobbin 27.

The second coil block 21 comprises a second annular bobbin 34 made of synthetic resin and a pair of second annular yokes 35 and 36 made of magnetic metal material. The second annular bobbin has a cylindrical winding portion 32 sandwiched between flanges 30 and 31 which are a pair of winding guides. A second exciting coil 33 is wound around the winding portion 32. The yokes 35 and 36 are located on opposite sides of the second annular bobbin 34 and laminated above and below (as viewed in the figure), respectively, the bobbin 34.

The second annular bobbin 34 has a pair of protruding portions 34a on the outer surface of the flange 30 and a pair of extensions 34b on the bottom surface of the flange 31. A pair of connector terminals 37 and 38 protrude from the extensions 34a, respectively, as described in detail later.

The second annular yokes 35 and 36 have guide portions, for example a plurality of pole teeth 35a and 36a extending to the inner surface of the winding portion 32 of the second annular bobbin 34. These pole teeth 35a and 36a are arranged in a saw-toothed manner and encircle the inner surface of the winding portion 32. One annular yoke 35 is shaped like a flat plate and formed with a cutout 35b at a position corresponding to the cutout 29b in the first annular yoke 29. The coil guide portion 27a of the first annular bobbin 27 is fitted in the cutout 35b. The other annular yoke 36 is shaped like a cup so as to be capable of receiving the second annular bobbin 34. The yoke 36 has a pair of cutouts 36b corresponding to the protruding portions 34b formed on the second annular bobbin 34. The protruding portions 34a can be fitted in the cutouts 36b. The yoke 36 is provided with a pair of piercing portions 36c. The protruding portions 34a are fitted in the piercing portions 36c and permit the connector terminals 37 and 38 to extend outwardly of the second coil block 21.

The laminations of these coil blocks 20 and 21 are coaxially laminated. Metallic top and bottom plates 41 and 42, respectively, have bearing portions 39 and 40, respectively, at their centers. The laminations are mounted between these plates 41 and 42, thus forming a stator. In this case, a pair of holes 42a extend through the bottom plate 42 at a position corresponding to the piercing portion 36c in the annular yoke 36. The extensions 34b of the second annular bobbin 34 are fitted in the piercing portions 36c and allow the connector terminals 37 and 38 to extend outwardly.

The magnet rotor 22 is rotatably mounted in a space 43 (see FIG. 2) between the laminations of the coil blocks 20 and 21 formed inside the winding portions 25 and 32 of the annular bobbins 27 and 34, respectively. The rotating shaft 44 pivoted to the bearing portions 39 and 40 of the top plate 41 and the bottom plate 42, respectively, are fixed at the center of the rotor 22. The plural magnetic poles located opposite to the pole teeth 28a, 29a, 35a, and 36a of the annular yokes 28, 29, 35, 36 with a given space therebetween are magnetized on the outer surface of the magnet rotor 22. Exciting signals are supplied to the magnetic poles and to the exciting coils 26, 33, thus producing magnetic interaction with the excitation poles guided to the teeth 28a, 29a, 35a, and 36a. Consequently, the magnet rotor 22 is rotated in given angular steps.

Figure 2:
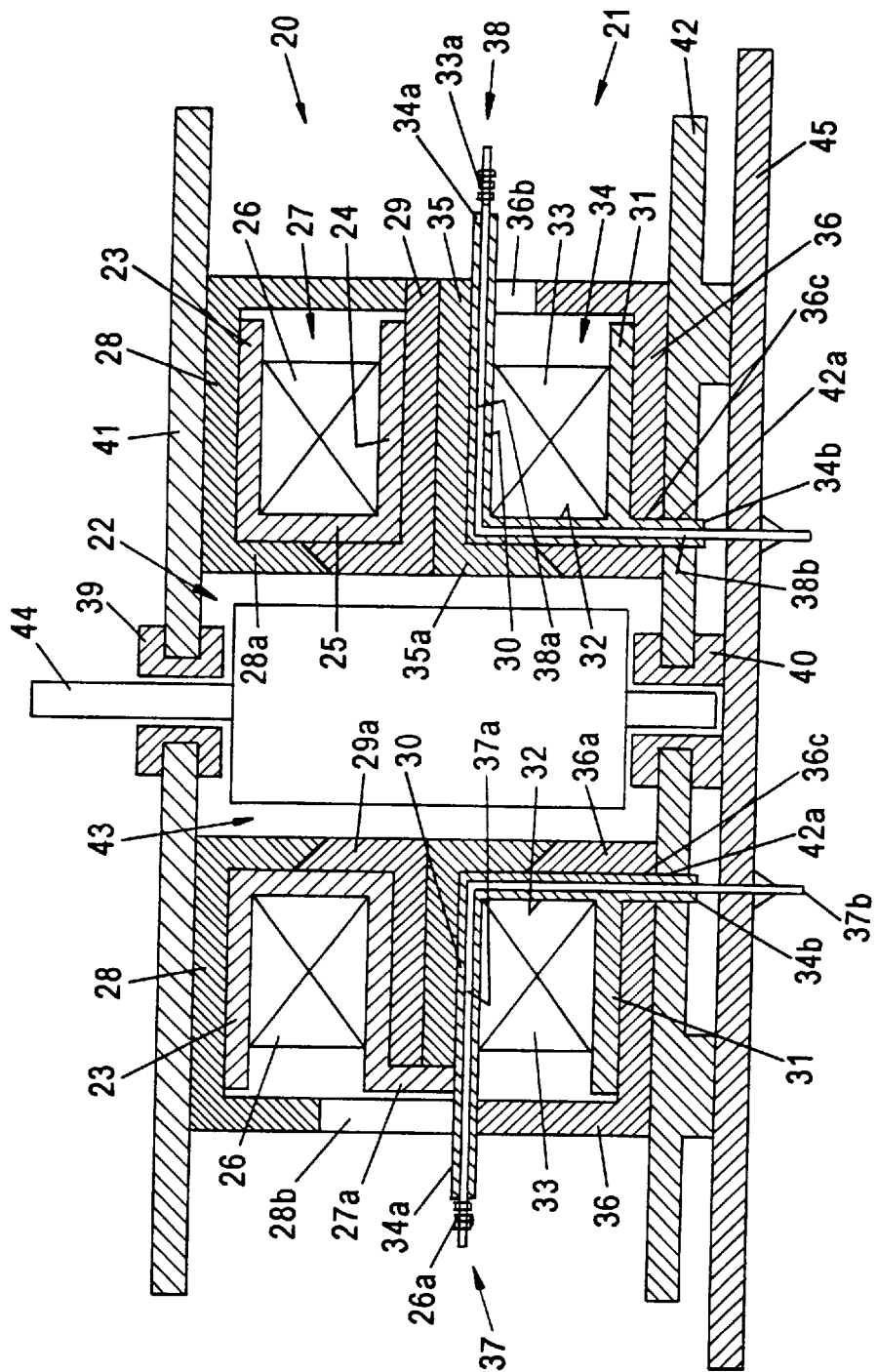
FIG. 2 is a cross-sectional view showing the state of assembly of FIG. 1 together with an external electric apparatus.

FIG. 2 is a cross-sectional view showing a printed-wiring board acting as an external electric apparatus, as well as the state of assembly of FIG. 1. The connector terminals 37 and 38 are buried in the second annular bobbin 34 of the second coil block 21 by insert molding or other method, the bobbin 34 being located on the side of the printed-wiring board 45. The connector terminals 37 and 38 have the lirst connection portions 37a, 38a and the second connection portions 37b, 38b continuous with the first connection portions. The first connection portions extend in a direction substantially perpendicular to the axis of the rotating shaft 44 inside the flange 30, and protrude in the same direction from the flange 30. The terminal ends 26a and 33a of the exciting coils 26 and 33 of the coil blocks 20 and 21, respectively, are electrically connected with the protruding ends of the connector terminals 37 and 38. The second connection portions 37b and 38b extend in a direction substantially parallel to the axis of the rotating shaft 44 inside the winding portion 32 and protrude in the same direction from the winding portion 32. These protruding ends are electrically connected with the printed-wiring hoard 45 by soldering or other means.

The second connection portions 37b and 38b electrically connected with the printed-wiring hoard 45 protrude toward the printed-wiring board 45 via the piercing portion 36c, such as an opening, in the second annular yoke 36 and via the piercing portion 42a in the bottom plate 42. In this case, the extensions 34b extend along the second connection portions 37b and 38b up to the locations of the bottom surface of the winding portion 32 of the second annular bobbin 34 which correspond to the piercing portions 36c and 42a. The extensions 34b cover the surroundings of these piercing portions 36c and 42a. The extensions 34b prevent the second connection portions 37b and 38b from touching the second annular bobbin yoke 36 and the bottom plate 42. In this case, the extensions 34b act also to place the second annular bobbin 34, the second annular yoke 36, and the bottom plate 42 in position.

In the present example, the exciting coils 26 and 33 are coiled around the annular bobbins 27 and 34, respectively, in the manner described now. The annular yokes 29 and 35 are laminated on top of each other in such a way that the annular bobbins 27 and 34 located inside the yokes are held in the yokes. The connector terminals 37 and 38 have been previously buried in the bobbins, respectively. In this state, the annular yokes 28 and 36 shaped like a cup and located outside are not yet mounted. At this time, the terminal end 26a of the exciting coil 26 connected with the connector terminal 37 is laid out and guided through a guide groove 27c (see FIG. 1) formed in the outer surface of the coil guide portion 27a. After the winding operation, the annular yokes 28 and 36 have been mounted. Under this condition, the coil guide portion 27a prevents the terminal end 26a from coming into contact with the annular yokes 29 and 35 which are located in the wiring path going to the connector terminal 37. Furthermore, the cutout 28b formed in the annular yoke 28 keeps the terminal end 26a from touching the annular yoke 28.

In the above description of the present example, the printed-wiring board 45 is used as the external electric apparatus. The external electric apparatus electrically connected with the second connection portions 37b and 38b of the connector terminals 37 and 38 are not limited to the printed-wiring board 45. For instance, it may also be a relay terminal or connector which is placed on the printed-wiring board 45 or other electric apparatus and electrically connected with it.

As described thus far, in the present example, the first annular bobbins 27 and 34 coiled around the winding portions 25 and 32, respectively, are held between the opposite portions of the first and second annular yokes 28, 29, 35, and 36. The first and second exciting coils 26 and 33, respectively, are located between pairs of flanges 23, 24, 30, 31. Thus, the first and second coil blocks 20 and 21, respectively, are formed. These coil blocks 20 and 21 are laminated on top of each other, whereby the magnet rotor 22 is rotatably mounted in the gap 43 formed inside the winding portions 25 and 32, the rotor 22 having the rotating shaft 14 mounted thereto. The plural pole teeth 28a, 29a, 35a, and 36a for guiding the excitation poles of the exciting coils 26, 33 to the space 43 extend from the annular yokes 28, 29, 35, and 36 corresponding to the coil blocks 20, 21. The connector terminals 37 and 38 consisting of the first connection portions 37a, 38a and the second connection portions 37b, 38b are buried in the annular bobbin 34 of the second coil block 21. The first connection portions 37a and 38a extend from the flange 30 in a direction substantially perpendicular to the axis of the rotating shaft 44. The second connection portions 37b and 38b extend from the winding portion 32 in a direction substantially parallel to the axis of the rotating shaft 44. The terminal ends 26a, 33a of the first and second exciting coils 26, 33, respectively, are electrically connected with the protruding ends of the first connection portions 37a, 38a. The protruding ends of the second connection portions 37b, 38b are electrically connected with the printed-wiring board (external electric apparatus) 45. Since the connector terminals 37 and 38 are not positioned on the outer periphery of the winding portion 32 of the annular bobbin 34, it is easy to perform the winding operation. Furthermore, increase in size of the motor itself is suppressed. Hence, the motor can be miniaturized.

Also in the present example, the second connection portions 37b and 38b protrude to the printed-wiring board 45 via the piercing portion 36c formed in the annular yoke 36. The extensions 34b are formed in the positions of the annular bobbin 34 and of the bottom plate 42 corresponding to the piercing portion 36c. The extensions 34b extend along the second connection portions 37b and 38b toward the printed-wiring board 45. It is unlikely that the second connection portions 37b, 38b touch the annular yoke 26 and the bottom plate 42 due to bending of the second connection portions 37b and 38b. As a result, good insulation can be maintained.

Figure 3:
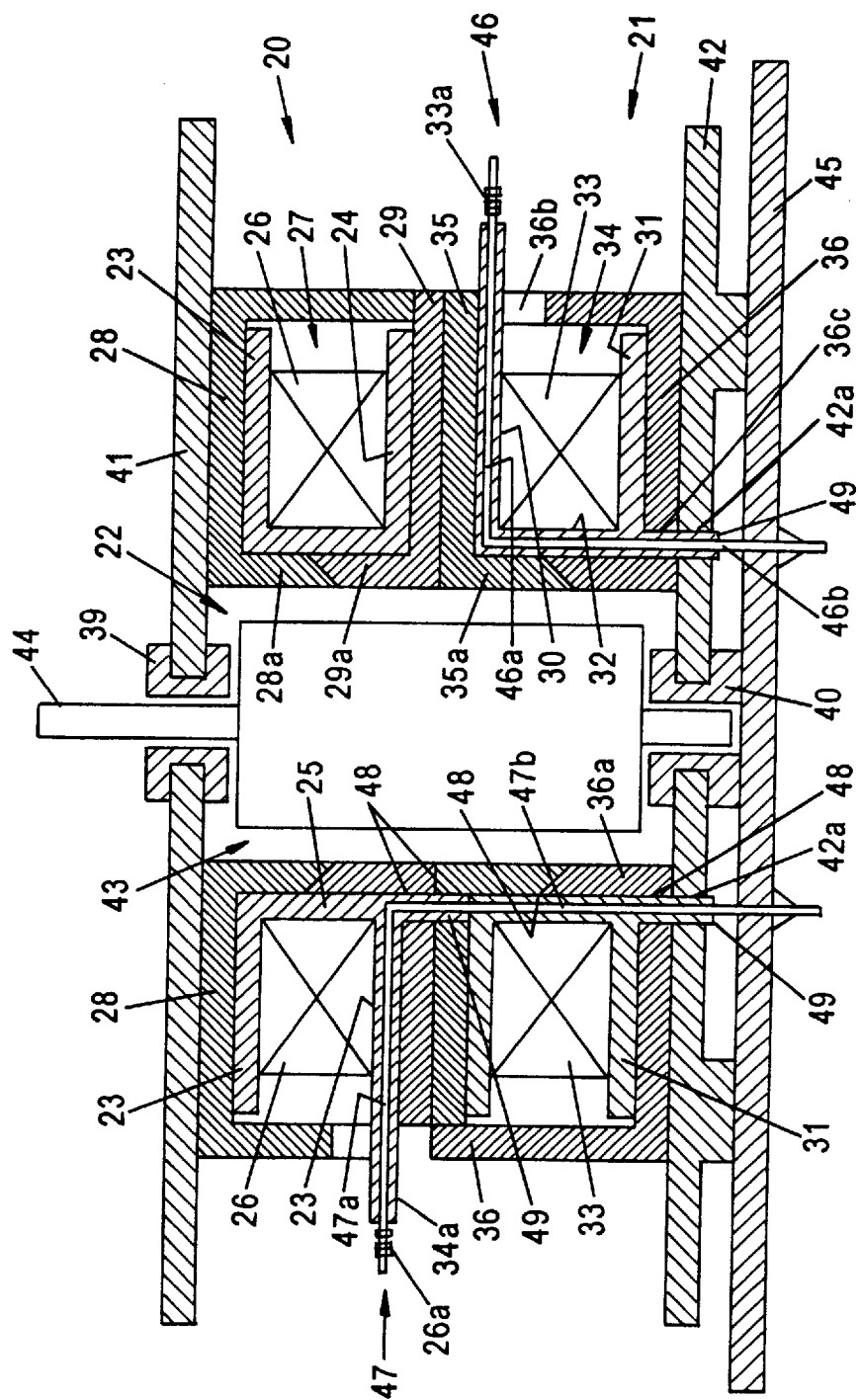
FIG. 3 is a cross-sectional view showing a second embodiment.

FIG. 3 is a cross-sectional view illustrating a second embodiment of the present invention. It is to be noted that like components are indicated by like reference numerals and that those components which have been already described in relation to the first embodiment will not be described in detail below.

In the present example, of the first and second coil blocks 20 and 21, respectively, the annular bobbin 34 of the second coil block 21 is located on the side of the printed-wiring hoard 45. A first connector terminal 46 consisting of a first connection portion 46a and a second connection portion 46b is buried in the annular bobbin 34. The first connection portion 46a extends through the flange 30 in a direction substantially perpendicular to the axis of the rotating shaft 44. This extending ends protrude from the flange 30 in the same direction. The second connection portion 46b extends through the winding portion 32 in a direction substantially parallel to the axis of the rotating shaft 44. The extending ends from the winding portion 32 protrude in the same direction. The terminal end 33a of the exciting coil 33 of the second coil block 21 is electrically connected with the protruding end of the first connection portion 46a. The extending end of the second connection portion 46b extends through the piercing portion 36c in the annular yoke 36 and through the hole 42a in the bottom plate 42, and is electrically connected with the printed-wiring board 45.

On the other hand, the first coil block 20 is located on the opposite side of the second coil block 21 from the printed-wiring board 45. A second connector terminal 47 consisting of a third connection portion 47a and a fourth connection portion 47b is buried in the annular bobbin 27 of the first coil block 20. The third connection portion 47a extends through the flange 23 in a direction substantially perpendicular to the axis of the rotating shaft 44. The extending ends of the third connection portion 47a protrude from the flange 23 in the same direction. The fourth connection portion 47b protrudes from the winding portion 25 in a direction substantially parallel to the axis of the rotating shaft 44. The terminal end 26a of the exciting coil 26 of the first coil block is electrically connected with the protruding end of the third connection portion 47a. The protruding end of the fourth connection portion 47b extends through a piercing portion 48 and through the hole 42a formed in the bottom plate 42. The piercing portion 48 is formed in the annular yoke 29, annular yokes 35, 36 of the second coil block 21, and winding portion 32 of the annular bobbin 34. The protruding end of the third connection portion is electrically connected with the printed-wiring board 45.

Also in this structure, the connector terminals 46 and 37 are not located on the outer surfaces of the winding portions 25, 32 of the annular bobbins 27, 34 and so it is easy to perform winding operation. Furthermore, increase in size of the motor itself is restricted. Hence, miniaturization can be accomplished. Also in the present example, the annular bobbins 27 and 34 have the connector terminals 46 and 47, respectively, capable of holding the terminal ends 26a and 33a, respectively, of the exciting coils 26 and 33. This makes it possible to wind the coils 26 and 33 on the annular bobbins 27 and 34 separately. As a consequence, the assembly operation and the winding operation can be carried out with higher efficiency than the first embodiment described above.

Also in the present example, the second and fourth connection portions 46b and 47b, respectively, extend to the printed-wiring hoard 45 through the piercing portions 36c, 48 and through the hole 42a. The piercing portions 36c and 48 extend through the annular yokes 29, 35, and 36. The hole 42a extends through the bottom plate 42. Extensions 49 are located at the positions of the bottom surfaces of the annular bobbins 27 and 34 which correspond to these piercing portions 36c, 48, and 42a. The extensions 49 extend along the second and fourth connection portions 46b and 47b, respectively, encircle them, and go to the printed-wiring board 45. The extensions 49 prevent the second and fourth connection portions 46b and 47b, respectively, from touching the annular yokes 29, 35, 36 and the bottom plate 42. In this case, the extensions 49 serve also to place the coil blocks 20 and 21 in position relative to each other. The extensions 49 also place the coil blocks 20 and 21 in position relative to the bottom plate 42.

Also in this structure, it is unlikely that the second connection portions 46b, 47b touch the annular yokes 29, 35, 36 and the bottom plate 42 due to bending of the second and fourth connection portions 46b and 47b, respectively. As a result, good insulation can be maintained.

In the present example, the extensions 49 extending along the second and fourth connection portions 46b and 47b, respectively, are formed in their corresponding portions. It is also possible to form the extensions 49 only in locations where short circuit is a subject of concern.

Figure 4:
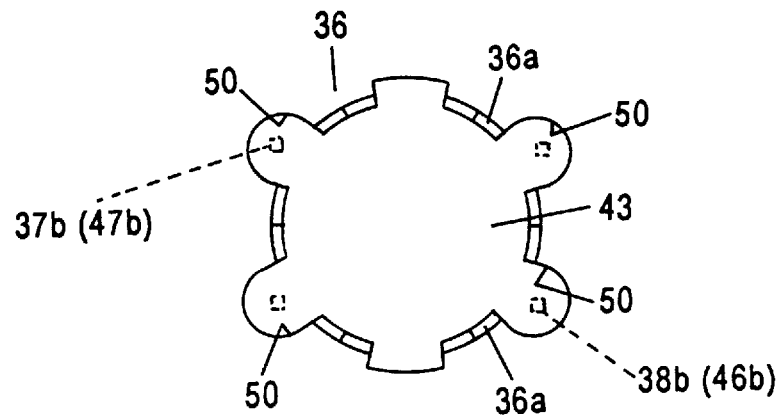
FIG. 4 is a front elevation showing main portions of a third embodiment.
Figure 5:
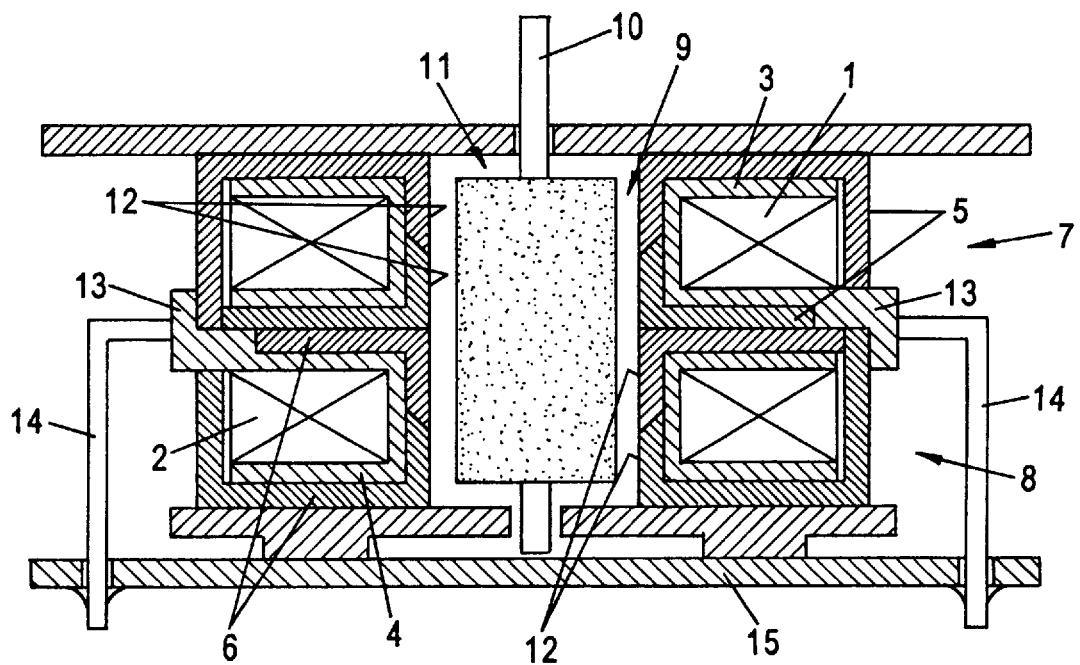
FIG. 5 is a cross-sectional view showing a conventional example.

In the above embodiments, the piercing portions 36c and 48 in the annular yokes 29, 35, 36 permit the second and fourth connection portions 37b, 38b, 46b, and 47b (extensions 31a and 49) to extend through the yokes and take the form of holes extending through the annular yokes. Since the second and fourth connection portions 37b, 38b, 46b, 47b must extend along the axis of the rotating shaft 44, the piercing portions 36c and 48 are located close to the pole teeth 29a, 35a, and 36a. However, if these piercing portions 36c and 48 were formed in the flat surfaces of the annular yokes 29, 34, and 36 near the teeth 29a, 35a, 36a, then the piercing portions 36c and 48 would be positioned on the magnetic circuit going from the annular yokes 29, 34, 36 from the teeth 29a, 35a, 36a. Hence, the magnetic circuit would be adversely affected. If the piercing portions 36c and 48 extending through the yokes are located close to the pole teeth 29a, 35a, and 36a, it is difficult to effect a machining operation. Accordingly, a third embodiment of the invention is shown in FIG. 4, where the piercing portions extending through the second and fourth connection portions 37b, 38b, 46b, and 47b are replaced by cutouts 50 which are located between the bases of the pole teeth 29a, 35a, 36a and open into the space 43. In this case, the annular yokes 29, 34, 46 can be machined with greater ease than in the above-described embodiments where the piercing portions 36c and 48 extending through the yokes are used. Furthermore, the adverse effect on the magnetic circuit formed in the annular yokes 29, 34, and 36 including the pole teeth 29a, 35a, and 36a can be reduced.

As described in detail thus far, the present invention provides a structure comprising: a first coil block composed of a first annular bobbin and first annular yokes, said first annular bobbin comprising a first exciting coil wound around a cylindrical winding portion, said first annular yokes being laminated on opposite sides of said first annular bobbin, said first annular yokes acting to guide excitation poles of said first exciting coil toward inner surface of said winding portion; a second coil block composed of a second annular bobbin and second annular yokes, said second annular bobbin comprising a second exciting coil wound around a cylindrical winding portion, said second annular yokes being laminated on opposite sides of said second annular bobbin, said second annular yokes acting to guide excitation poles of said second exciting coil toward inner surface of said winding portion, said second coil block being laminated over said first coil bobbin coaxially; a magnet rotor having a rotating shaft rotatably held in a space formed inside said winding portions by laminating said first and second coil blocks, said magnet rotor being rotated by the excitation poles of said first and second annular yokes; and connector terminals buried in said annular bobbin of one of said coil blocks and having a first connection portion and a second connection portion, said first connection portion protruding in a direction substantially perpendicular to axis of said rotating shaft, said first connection portion being electrically connected with terminal ends of said first and second exciting coils, said second connection portion protruding from said winding portions in a direction substantially parallel to the axis of said rotating shaft, said second connection portion being electrically connected with an external electric apparatus. Since the connector terminals are not located on the outer surfaces of the windings of the annular bobbins, it is easy to wind the windings. Furthermore, increase in size of the motor itself can be suppressed.

In one feature of the invention, said second connection portion extends toward said external electric apparatus via a piercing portion formed in said annular yoke and said annular bobbin has an extension extending along said second connecting portion toward said external electric apparatus. The second connection portions are prevented from touching the annular yokes. Thus, good insulation can be maintained.

The present invention also provides a structure comprising: a first coil block composed of a first annular bobbin and first annular yokes, said first annular bobbin comprising a first exciting coil wound around a cylindrical winding portion, said first annular yokes being laminated on opposite sides of said first annular bobbin, said first annular yokes acting to guide excitation poles of said first exciting coil toward inner surface of said winding portion; a second coil block composed of a second annular bobbin and second annular yokes, said second annular bobbin comprising a second exciting coil wound around a cylindrical winding portion, said second annular yokes being laminated on annular yokes acting to guide excitation poles of said second exciting coil toward inner surface of said winding portion, said second coil block being laminated over said first coil bobbin coaxially; a magnet rotor having a rotating shaft rotatably held in a space formed inside said winding portions by laminating said first and second coil blocks, said magnet rotor being rotated by the excitation poles of said first and second annular yokes which are guided to pole teeth of said first and second annular yokes, respectively; first connector terminals buried in said annular bobbin of one of said coil blocks and having a first connection portion and a second connection portion, said first connection portion protruding in a direction substantially perpendicular to axis of said rotating shaft, said first connection portion being electrically connected with terminal ends of said first and second exciting coils, said second connection portion protruding from said winding portions in a direction substantially parallel to the axis of said rotating shaft, said second connection portion being electrically connected with an external electric apparatus; and second connector terminals buried in said annular bobbin of the other coil block and having a third connection portion and a fourth connection portion, said third connection portion protruding in a direction substantially perpendicular to the axis of said rotating shaft, said third connection portion being electrically connected with terminal ends of said exciting coils of the other coil block, said fourth connection portion protruding from said winding portions in a direction substantially parallel to the axis of said rotating shaft, said fourth connection portion extending through said one coil block, said fourth connection portion being electrically connected with the external electric apparatus. Since the connector terminals are not located on the outer surfaces of the windings of the annular bobbins, it is easy to wind the windings. Furthermore, increase in size of the motor itself can be suppressed.

In another feature of the invention, said second or fourth connection portion projects toward, or passes through, said external electric apparatus via a piercing portion formed in said annular yoke, and said annular bobbin has an extension extending along said second or fourth connection portion toward said external electrical apparatus. The second or fourth connection portions are prevented from touching the annular yokes. Consequently, good insulation can be maintained.

In a further feature of the invention, said annular yokes have a plurality of pole teeth extending into said winding portions, and said second or fourth connection portion extends through said annular yoke without touching said pole teeth via a cutout that is formed between bases of said pole teeth and opens into said space. Therefore, the annular yokes through which the second or fourth connection portions extend can be machined easily. Furthermore, the adverse effect on the magnetic circuit formed in the annular yokes including the pole teeth can be alleviated.

20, 21: first and second coil blocks, respectively;
    22: magnet rotor;
    23, 24, 30, 31: flanges;
    25, 32: winding portions;
    26, 33: first and second exciting coils, respectively;

26a, 33a: terminal ends;
27, 34: first and second annular bobbins, respectively;
27a: coil guide portion;
27c: guide groove;
28, 29, 35, 36: first and second annular yokes;
28a, 29a, 35a, 36a: pole teeth;
28b, 29b, 35b, 36b: cutouts;
34a: protruding portion;
34b, 49: extensions;
36c, 48: piercing portions;
37, 38: connector terminals;
37a, 38a, 46a: first connection portions;
37b, 38b, 46b: second connection portions;
39, 40: bearing portions;
41, 42: top and bottom plates, respectively;
42a: through-hole;
43: gap;
44: rotating shaft;
45: printed-wiring board;
46: first connector terminal;
47: second connector terminal;
47a, 47b: third and fourth connection portions, respectively;
50: cutout

We claim:

1. A stepper motor comprising:

a first coil block composed of a first annular bobbin and first annular yokes, said first annular bobbin comprising a first exciting coil wound around a cylindrical winding portion, said first annular yokes being laminated on opposite sides of said first annular bobbin, wherein guide portions on said first annular yokes guide excitation poles of said first exciting coil toward an inner surface of said winding portion;

a second coil block composed of a second annular bobbin and second annular yokes, said second annular bobbin comprising a second exciting coil wound around a cylindrical winding portion, said second annular yokes being laminated on opposite sides of said second annular bobbin, wherein guide portions on said second annular yokes guide excitation poles of said second exciting coil toward an inner surface of said winding portion, said second coil block being laminated over said first coil block coaxially;

a magnet rotor having a rotating shaft rotatably held in a space formed inside said winding portions by laminating said first and second coil blocks, said magnet rotor being rotated by the excitation poles of said first and second annular yokes; and connector terminals buried in said annular bobbin of one of said coil blocks and having a first connection portion and a second connection portion, said first connection portion protruding in a direction substantially perpendicular to an axis of said rotating shaft, said first connection portion being electrically connected with terminal ends of a respective coil, said second connection portion protruding from said winding portions in a direction substantially parallel to the axis of said rotating shaft, said second connection portion being electrically connected with an external electric apparatus.

2. The stepper motor of claim 1, wherein said second connection portion extends toward said external electric apparatus via an opening formed in said annular yoke and wherein said annular bobbin has an extension extending along said second connecting portion toward said external electric apparatus.

3. A stepper motor comprising:

a first coil block composed of a first annular bobbin and first annular yokes, said first annular bobbin comprising a first exciting coil wound around a cylindrical winding portion, said first annular yokes being laminated on opposite sides of said first annular bobbin, wherein guide portions on said first annular yokes guide excitation poles of said first exciting coil toward an inner surface of said winding portion;

a second coil block composed of a second annular bobbin and second annular yokes, said second annular bobbin comprising a second exciting coil wound around a cylindrical winding portion, said second annular yokes being laminated on opposite sides of said second annular bobbin, wherein guide portions on said second annular yokes guide excitation poles of said second exciting coil toward an inner surface of said winding portion, said second coil block being laminated over said first coil bobbin coaxially;

a magnet rotor having a rotating shaft rotatably held in a space formed inside said winding portions by laminating said first and second coil blocks, said magnet rotor being rotated by the excitation poles of said first and second annular yokes;

first connector terminals buried in said annular bobbin of said first coil block and having a first connection portion and a second connection portion, said first connection portion protruding in a direction substantially perpendicular to an axis of said rotating shaft, said first connection portion being electrically connected with terminal ends of said exciting coil being wound on the first bobbin in which said first connector terminals are buried, said second connection portion protruding from said winding portions in a direction substantially parallel to the axis of said rotating shaft, said second connection portion being electrically connected with an external electric apparatus; and second connector terminals buried in said annular bobbin of said second coil block and having a third connection portion and a fourth connection portion, said third connection portion protruding in a direction substantially perpendicular to the axis of said rotating shaft, said third connection portion being electrically connected with terminal ends of said exciting coil being wound on the second bobbin in which said second terminals are buried, said fourth connection portion protruding from said winding portions in a direction substantially parallel to the axis of said rotating shaft, said fourth connection portion extending through the first coil block, said fourth connection portion being electrically connected with the external electric apparatus.

4. The stepper motor of claim 3, wherein at least one of said second and fourth connection portions is configured for projecting toward and passing through said external electric apparatus via an opening formed in said annular yoke, and wherein said annular bobbin has an extension extending along said second or fourth connection portion toward said external electrical apparatus.

5. The stepper motor of claim 1, wherein said annular yokes have a plurality of pole teeth extending into said winding portions, and wherein said second and fourth connection portions extend through said annular yokes via a cutout being formed between bases of said pole teeth and opens into said space.

6. The stepper motor of claim 3, wherein said annular yokes have a plurality of pole teeth extending into said winding portions, and wherein said second and fourth connection portions extend through said annular yokes via a cutout formed between bases of said pole teeth and opening into said space.

* * * * *